(12) United States Patent
Alexander et al.

(10) Patent No.: US 11,434,825 B2
(45) Date of Patent: Sep. 6, 2022

(54) METHOD AND DEVICE TO CONTROL A FUEL SPLIT IN A COMBUSTION DEVICE

(71) Applicant: Siemens Energy Global GmbH & Co. KG, Munich (DE)

(72) Inventors: Varkey Alexander, Nantwich (GB); Kexin Liu, Lincoln (GB); Victoria Sanderson, Lincoln (GB)

(73) Assignee: Siemens Energy Global GmbH & Co. KG, Munich (DE)

(*) Notice: Subject to any disclaimer, the term of this patent is extended or adjusted under 35 U.S.C. 154(b) by 940 days.

(21) Appl. No.: 15/311,934

(22) PCT Filed: May 27, 2015

(86) PCT No.: PCT/EP2015/061712
§ 371 (c)(1),
(2) Date: Nov. 17, 2016

(87) PCT Pub. No.: WO2015/185413
PCT Pub. Date: Dec. 10, 2015

(65) Prior Publication Data
US 2017/0089266 A1    Mar. 30, 2017

(30) Foreign Application Priority Data
Jun. 2, 2014 (EP) .................................. 14170793

(51) Int. Cl.
*F02C 7/228* (2006.01)
*F23N 1/00* (2006.01)
(Continued)

(52) U.S. Cl.
CPC .............. *F02C 7/228* (2013.01); *F02C 9/34* (2013.01); *F23N 1/002* (2013.01); *F23N 5/022* (2013.01);
(Continued)

(58) Field of Classification Search
CPC .. F23R 3/343; F23R 3/34; F23R 3/346; F23R 3/36; F23R 2900/00013; F02C 7/288;
(Continued)

(56) References Cited

U.S. PATENT DOCUMENTS 5,884,606 A     3/1999 Kellner
8,313,324 B2 *  11/2012 Bulat ................... F02C 7/228
                                                   431/12
(Continued)

FOREIGN PATENT DOCUMENTS

CN     1169178 A    12/1997
EP     1746347 A2    1/2007
(Continued)

OTHER PUBLICATIONS

CN search report dated Feb. 6, 2018, for CN patent application No. 2015800293185.
(Continued)

*Primary Examiner* — Ehud Gartenberg
*Assistant Examiner* — Jacek Lisowski

(57) ABSTRACT

A method, control unit and rotating machine for determining a fuel split setting value for adjusting a fuel split setting for a combustion device, the fuel split setting defining a relation between main fuel and pilot fuel. The method includes: retrieving a first information item correlated to heating value of supplied main fuel; retrieving a second information item correlated to combustor operating condition; retrieving at least one third information item representing stability of combustion; selecting a predefined pair of minimum and maximum boundary curves for the fuel split setting from a plurality of predefined pairs based on the first and second information items, the minimum and maximum boundary curves defining a band of fuel split settings permitted for a range of second information item values; determining the
(Continued)

fuel split setting value within the selected pair of minimum and maximum boundary curves based on the third information item.

21 Claims, 7 Drawing Sheets

(51) Int. Cl.
    *F23N 5/02*           (2006.01)
    *F23N 5/24*           (2006.01)
    *F23R 3/34*           (2006.01)
    *F02C 9/34*           (2006.01)
    *F23N 5/10*           (2006.01)
    *F23R 3/36*           (2006.01)

(52) U.S. Cl.
    CPC ............. *F23N 5/102* (2013.01); *F23N 5/242* (2013.01); *F23R 3/34* (2013.01); *F23R 3/36* (2013.01); *F05D 2260/964* (2013.01); *F05D 2270/14* (2013.01); *F23N 2237/04* (2020.01)

(58) Field of Classification Search
    CPC .... F02C 9/34; F02C 7/228; F02C 9/28; F02C 9/26; F02C 7/343; F05D 2260/964; F05D 2270/14; F05D 2270/083; F05D 2270/301; F05D 2270/303; F05D 2270/304; F05D 2270/31; F05D 2270/331; F05D 2270/334; F05D 2270/335; F23N 1/002; F23N 1/007; F23N 5/022; F23N 5/102; F23N 5/242; F23N 2041/20
See application file for complete search history.

(56) References Cited

U.S. PATENT DOCUMENTS

| 2007/0113560 | A1* | 5/2007 | Steber | ................... F23N 5/003 60/773 |
| 2007/0119178 | A1 | 5/2007 | Berenbrink | |
| 2007/0271024 | A1 | 11/2007 | Fujii et al. | |
| 2010/0275609 | A1* | 11/2010 | Snider | ................... F02C 3/305 60/773 |
| 2012/0196234 | A1* | 8/2012 | Bulat | ................... F23R 3/286 431/13 |

FOREIGN PATENT DOCUMENTS

| EP | 1770331 | A2 | 4/2007 |
| EP | 2450551 | A2 | 5/2012 |
| GB | 2434437 | A | 7/2007 |
| RU | 2189476 | C2 | 9/2002 |
| RU | 2455512 | C2 | 7/2012 |
| WO | 2007082608 | A1 | 7/2007 |
| WO | 2011042037 | A1 | 4/2011 |
| WO | 2011064142 | A1 | 6/2011 |
| WO | 2011064343 | A1 | 6/2011 |
| WO | 2011137110 | A1 | 11/2011 |

OTHER PUBLICATIONS

EP Search Report dated Oct. 28, 2014, for EP patent application No. 14170793.5.
International Search Report dated Aug. 11, 2015, for PCT application No. PCT/EP2015/061712 (previously submitted).
Russian Federation decision of grant dated Mar. 7, 2018, for RU patent application No. 2016151781.

* cited by examiner

METHOD AND DEVICE TO CONTROL A FUEL SPLIT IN A COMBUSTION DEVICE

CROSS REFERENCE TO RELATED APPLICATIONS

This application is the US National Stage of International Application No. PCT/EP2015/061712 filed May 27, 2015, and claims the benefit thereof. The International Application claims the benefit of European Application No. EP14170793 filed Jun. 2, 2014. All of the applications are incorporated by reference herein in their entirety.

FIELD OF THE INVENTION

The invention relates to a method and device to control a fuel split in a combustion device, particularly of a gas turbine engine.

BACKGROUND OF THE INVENTION

Combustion devices, for example combustors of gas turbine engines, fulfil the task to provide a hot working fluid to mechanically drive further downstream components, e.g. to act upon turbine blades of the gas turbine engine to generate a rotating movement of a shaft to which the turbine blades are attached. One primary goal is to operate such an engine with high effectiveness. Furthermore temperatures in the combustor or in an initial region of a turbine section must stay below a specific temperature level which is acceptable due to the used materials and coatings. Even a further goal is to reduce emissions of the engine. Another goal is to have a reliable and stable operation. Most of these goals stay in conflict with each other.

For example medium calorific value fuels (MCV fuels) and low calorific value fuels (LCV fuels) can be used to reduce NOx emissions. On the other hand these fuels could result in an unstable combustion. It may not be an option to select a fuel with a specific calorific value as it may be a goal to provide a combustor that can operate reliably with different types of fuels.

To support a stable combustion and for a reliable flame ignition and start-up procedure, combustors of gas turbine engines may be provided with fuel at different positions within the combustor. These different positions may also be provided with an individual fuel supply amount. A main fuel, which should be sufficient for a designed stable working point during a steady state mode of operation, may be provided at a first position. A so called pilot fuel, which may particularly be injected during start-up, transient or unstable operation, may be provided at a second position or location within the combustor.

During operation of the combustor the fuel split a split between main and pilot fuel may be adjusted, particularly via valves. This allows having an optimised configuration throughout start-up, transient, and/or stable operation.

The fuel split setting may be predefined, particularly given from calculations and derived from engine testing. During operation, the fuel split setting then is controlled according to the predefined values.

According to WO 2011/137110 A1 tuning processes implemented by an auto-tune controller are provided for measuring and adjusting the combustion dynamics and the emission composition of a gas turbine engine. The tuning process includes monitoring parameters, such as combustion dynamics and emission composition. Upon determining that one or more of the monitored parameters exceed a critical value, these "out-of-tune" parameters are compared to a scanning order table. The first out-of-tune parameter is then plotted as overlaid slopes on respective graphs, where the graph represents a fuel-flow split. The slopes for each graph are considered together by taking into account the combined impact on each out-of-tune parameter when a fuel-flow split is selected for adjustment.

GB 2 434 437 A and US 2007/271024 A1 also show procedures how a fuel split setting can be selected and adjusted during operation.

It becomes even more complex, if the chemical composition of the supplied fuel is changed over time, e.g. when a switch-over to a different fuel is performed, when fuels from different sources are blended, or when a supplied fuel changes it chemical composition over time. All this can result in change of heating value of the fuel. As a result, even though the combustor supposedly had operated in stable conditions, the change of heating value can result in instabilities or pressure dynamics or over heating of components.

Thus it is a problem to provide a control method that allows to operate reliably in all the mentioned modes of operation for any given fuel composition and by fulfilling emission requirements.

SUMMARY OF THE INVENTION

The present invention seeks to mitigate these problems and drawbacks.

This objective is achieved by the independent claims. The dependent claims describe advantageous developments and modifications of the invention.

According to the invention, substantially a two step approach is followed: First, a predefined operational band of fuel split settings is selected to define an allowable range in which the schedule of operation is to be located. This selection is based on a first information item correlated to a heating value of the supplied fuel. Second, once an operational range of fuel split settings is selected by step 1, in step 2 a fuel split schedule to be followed is selected from the number of possible schedules that are lying within the selected range.

The operational band or range defines a band of allowable operating points for the pilot split setting in relation to the load of an engine or any combustor operating condition. A schedule then is a specific curve—within that band—for the pilot split setting in relation to the load of an engine or any combustor operating condition.

The pilot split itself is then controlled or adjusted according to the selected schedule, particularly based on verifying another parameter, e.g. the load or emissions. Advantageously the adjustment can be performed by a further sub-routine that can be selected from a set of possible sub-routines for adjustment.

In more detail, in accordance with the invention a method is proposed for determining a fuel split setting value utilisable for adjusting a fuel split setting for a combustion device, the fuel split setting defining a relation between main fuel provided at primary fuel injection points and pilot fuel provided at at least one secondary fuel injection point, both being supplied to the combustion device for being combusted to a combusted fluid, particularly both having the same chemical composition, particularly both being a gaseous fuel, the method comprising the steps of:—retrieving a first information item correlated to a heating value of supplied main fuel;—retrieving a second information item correlated to a combustor operating condition when combusting the main fuel and the pilot fuel, the second information item being particularly at least one of a firing temperature, an exit temperature of the combusted fluid exiting the combustion device, thrust of the combusted fluid, and an engine load of a rotating machine downstream of the combustor device and driven in response of a flow of the combusted fluid, particularly a gas turbine engine; —retrieving at least one third information item, the third information item representing stability of combustion in the combustion device, particularly representing at least one of combustion dynamics pressure, emission of NOx, emission of CO, combustion device surface temperature, combustion dynamics noise emission, vibration of the combustion device, and flame instability; —selecting a predefined pair of minimum and maximum boundary curves for the fuel split setting from a plurality of predefined pairs of boundary curves based on the first information item and the second information item, the pairs of minimum and maximum boundary curves defining a band of fuel split settings permitted for a range of second information item values; —determining the fuel split setting value within the selected pair of minimum and maximum boundary curves based on the third information item, wherein the determined fuel split setting value being utilisable for adjusting the fuel split setting for the combustion device.

As mentioned the fuel split defines the relation between main fuel and pilot fuel, e.g. given as a percentage. The fuel split is also referred to as pilot split. Two portions of fuel with substantially the same composition are controlled by the fuel split. The fuel split represents a relation between the primary fuel flow and the secondary fuel flow provided to different fuel injection points.

The above method is applicable during operation of the combustion device over a wide range of modes of operation. It may be applicable also for start-up. Possibly a specific start-up procedure may be used, though, in some engines.

The main fuel is provided at primary fuel injection points for well distributed fuel distribution. The location of the primary fuel injection points may allow a well mixed fuel and air mixture before this mixture is burnt.

The pilot fuel is provided at at least one secondary fuel injection point at location(s) at which the pilot fuel will be less well mixed with air compared to main fuel. The secondary fuel injection point(s) is/are present to sufficiently supply the flame with fuel to guarantee stable combustion.

The combustion device is present for providing a combusted gas flow to a rotating machine, particularly a gas turbine engine. Thus, the combustion device may particularly be a gas turbine combustor, e.g. of annular or can-annular type.

As said the first information item is correlated to a heating value of supplied main fuel or pilot fuel. The first information item may be the heating value, a derivative value or the Wobbe index of the supplied fuel. The first information item may also be a pair of lower heating value and upper heating value.

The second information item may reflect the exit temperature of the combusted fluid exiting the combustion device. This corresponds to the turbine entry temperature, which therefore also can be determined as second information item.

If the second information item refers to the engine load, possibly also the torque at the shaft could be determined.

The steps of determining the first and second information item may be performed at the same time.

The third information item corresponds to the stability of combustion. A large number of physical effects can be used to rank the stability. Besides the already mentioned parameters pressure fluctuation and dynamic pressure oscillation can be determined. For detecting flame instabilities may be determined also by an optical sensor.

All the values of the third information item may be determined continuously or periodically at discrete points in time.

The predefined pair of minimum and maximum boundary curves for the fuel split setting define boundaries for points of operation. Acceptable points of operation—permitted workpoints—fall in between these boundary curves. This can be called a band.

The pairs of minimum and maximum boundary curves may be preset. They may be defined based on ranges of Wobbe Indices.

The selection of the pairs of minimum and maximum boundary curves may be continuously updated in response to the fuel reading (as defined above). If the fuel reading does not change then the maximum/minimum settings—i.e. the selection of the pairs of minimum and maximum boundary curves—do not change.

A plurality of such bands of permitted region of points of operation may potentially overlap each other at least in parts. It is proposed that the bands are not disjunct. An overlap is advantageously present as then a changeover of your control method from one band to a new band may less frequently happen.

If a workpoint falls into a region in which two bands overlap, potentially both bands can be selected by the control method. Possibly also historic data—particularly historic data of the first and/or second and/or third information item—could be used to decide which one on the overlapping bands should be selected by the control method.

As mentioned before, the minimum and maximum boundary curves define a band of fuel split settings permitted for a range of second information item values, e.g. a band of fuel split settings for a range of engine loads. That means it is defined for a plurality or a range of potential engine loads a plurality or range of admissible fuel split settings.

The method according to the invention allows to determine a preferred fuel split setting value. The final determination which specific fuel split setting value should be selected can again be executed by another embedded procedure.

The inventive method is particularly advantageous is the selected band does not need to be updated frequently. It allows to select the best band up front such then the detailed control can optimised within that band.

In an embodiment the method may comprise a step of setting a control parameter to control an amount of main fuel feed provided to the primary fuel injection points and/or an amount of pilot fuel provided to the at least one secondary fuel injection point based on the determined fuel split setting value. Particularly a fuel valve may be controlled.

In another embodiment at least two selected from the first information item and the second information item and the at least one third information item may be retrieved synchronously. Particularly the first information item and the second information item may be retrieved synchronously, particularly only at discrete times.

Alternatively, the first information item may be retrieved once in a first time interval. The second information item and the at least one third information item may be retrieved once in a second time interval. The first time interval may be longer than the second time interval, particularly the first time interval may be longer than a plurality of the second time intervals. This may be advantageous if the fuel composition is not expected to change quickly in time.

In another embodiment the first information item may be retrieved in response to a change in composition for the supplied main fuel and/or the supplied pilot fuel. Advantageously the first information item may only be retrieved in case of a change in composition or in case of a switch over to a different fuel source. That means that the first information item may be retrieved in response to a switch over to a different source for the supplied main fuel and/or the supplied pilot fuel.

If the fuel composition from the same source varies vastly over time—drifts—the just mentioned method may be applicable e. g. when the fuel is blended. If the change is intentional then it can be referred to a switch over in the first instance between two fuels of the same type i.e. the fuel may stay as gas or liquid.

In an alternative such a switch over or blend could also be for a first fuel that is gas and a second fuel that is liquid or the other way around.

The step of determining the fuel split setting value may advantageously be executed continuously or in response of a change of the second information item and/or a change of the at least one third information item.

The control method may use sensor signals to retrieve the first, second, and/or third information items. Different types of sensors may be present in an engine. The control method may also use signals and data that are already derived via other control algorithms present.

Particularly, for the step of the retrieving of the first information item, the heating value of the supplied main fuel and/or the heating value of the supplied pilot fuel may be determined via a sensor signal within a fuel supply or a fuel supply line.

For the retrieving of the second information item also specific sensor signals may be derived from sensors, particularly for determining the firing temperature, the exit temperature of the combusted fluid exiting the combustion device, the thrust of the combusted fluid, a turbine entry temperature of a turbine section of the rotating machine, e.g. a gas turbine engine. The engine load of the rotating machine may be determined via a load indicator by evaluating torque of a shaft and/or revolving speed of the shaft of the rotating machine driven in response of the combustion by the combustion device.

For the retrieving the at least one third information item at least one sensor signal may be evaluated, the sensor signal representing at least one of combustion dynamics pressure, emission of NOx, emission of CO, combustion device surface temperature, noise emission, vibration of the combustion device, and flame failure.

As previously already addressed, the predefined pair of minimum and maximum boundary curves for the fuel split setting may be defined at least by a predefined maximum fuel split level—an upper threshold—and a predefined minimum fuel split level—a lower threshold—provided over a range of second information item values. The range mentioned may possibly cover all or a scope of possible operating conditions, from start-up, transient conditions up to full load stable conditions.

The maximum fuel split level may represent the relation between the pilot fuel and the main fuel with the highest tolerable percentage of the pilot fuel in relation to the main fuel. The minimum fuel split level may represent the relation between the pilot fuel and the main fuel with the lowest tolerable percentage of pilot fuel in relation to the main fuel. When the term "pilot fuel" or "main fuel" is used in this paragraph, it represents the fuel amount or the fuel level provided to the combustor(s) at a specific point in time.

In a slightly modified definition, the fuel split can also be defined as the amount of pilot fuel divided by the sum of the amounts of main fuel and pilot fuel.

Alternatively, the maximum and minimum fuel split level could be defined in an opposite way, i.e. the maximum fuel split level could alternatively represent the relation between the main fuel and the pilot fuel with the highest tolerable percentage of the main fuel in relation to the pilot fuel. The minimum fuel split level may then represent the relation between the main fuel and the pilot fuel with the lowest tolerable percentage of main fuel in relation to the pilot fuel.

Tolerable is meant as acceptable in respect of exhaust or in respect of instabilities.

In one embodiment the control method may comprise a step of selecting a predefined control logic method from a plurality of predefined control logic methods based on the first information item and/or the second information item and/or the third information item, wherein the step of determining the fuel split setting value is performed by executing the selected control logic method.

The invention is also directed to a combustion device control unit performing the previously mentioned method steps. The combustion device control unit comprises particularly:—a first data retrieving component for retrieving a first information item correlated to a heating value of supplied primary fuel of the main fuel; —a second data retrieving component for retrieving a second information item correlated to a combustor operating condition when combusting the main fuel and the pilot fuel, the second information item being particularly at least one of a firing temperature, an exit temperature of the combusted fluid exiting the combustion device, thrust of the combusted fluid, and an engine load of a rotating machine downstream of the combustor device and driven in response of a flow of the combusted fluid, particularly a gas turbine engine; —a third data retrieving component for retrieving at least one third information item, the third information item representing stability of combustion in the combustion device, particularly representing at least one of combustion dynamics pressure, emission of NOx, emission of CO, combustion device surface temperature, combustion dynamics noise emission, vibration of the combustion device, and flame instability; —a selection component for selecting a predefined pair of minimum and maximum boundary curves for the fuel split setting from a plurality of predefined pairs of boundary curves based on the first information item and the second information item, the minimum and maximum boundary curves defining a band of fuel split settings permitted for a range of second information item values; —determination unit for determining the fuel split setting value within the selected pair of minimum and maximum boundary curves based on the third information item, wherein the determined fuel split setting value being utilisable for adjusting the fuel split setting for the combustion device.

The combustion device control unit may advantageously comprise a control output interface for setting a control parameter to control, particularly by means of one or more valves, an amount of main fuel and/or an amount of pilot fuel to be supplied to the combustion device based on the determined fuel split setting value.

Besides, the invention is also directed to a rotating machine, particularly a gas turbine engine, comprising:—a combustion device, —a combustion device control unit as defined above to control the fuel split setting value of the combustion device according to the method steps as defined above, —a shaft, and—a turbine section downstream of the combustion device for driving a rotation of the shaft in response to a combusted fluid provided from the combustion device to the turbine section during operation.

Previously the invention was explained for a main and a pilot fuel. Nevertheless also a plurality of groups of individually controllable fuel injection points can be present. Then the fuel split would define a ratio of fuel provided to the different groups of fuel injection points.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment.

BRIEF DESCRIPTION OF THE DRAWINGS

Embodiments of the invention will now be described, by way of example only, with reference to the accompanying schematical drawings, of which.

The illustration in the drawing is schematical. It is noted that for similar or identical elements in different figures, the same reference signs will be used.

Some of the features and especially the advantages will be explained for an assembled gas turbine, but obviously the features can be applied also to the single components of the gas turbine but may show the advantages only once assembled and during operation. But when explained by means of a gas turbine during operation none of the details should be limited to a gas turbine while in operation. As the invention is related to stable combustion, the features can also applied to different types of machines that comprise a combustor and that can be supplied by different types of fuels.

DETAILED DESCRIPTION OF THE INVENTION

Combustion devices are employed in a number of different environments, including gas turbines, furnaces and boilers.

Figure 1:
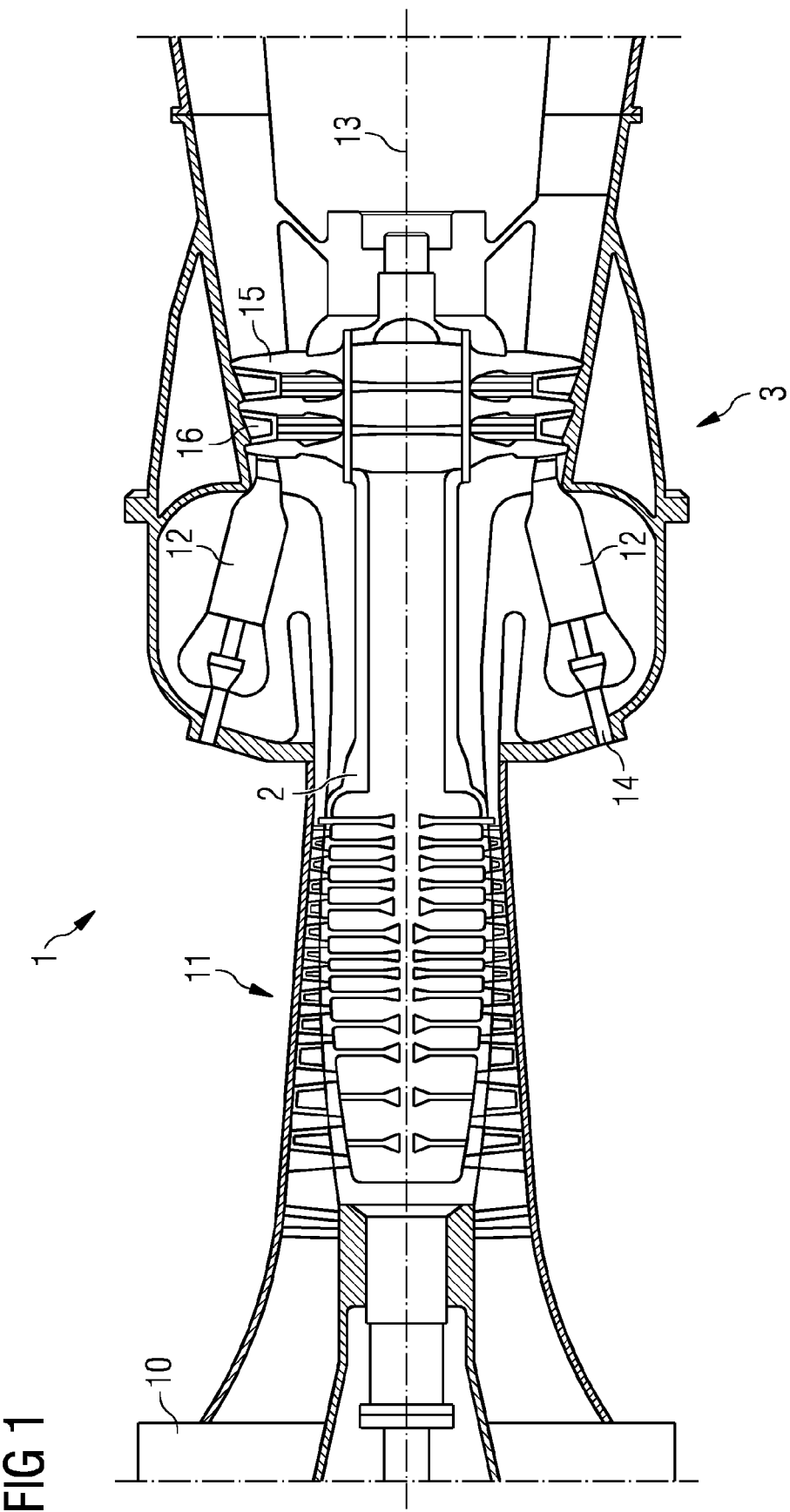
FIG. 1: shows a longitudinal section of a typical gas turbine.

An example of a typical gas-turbine arrangement 1 as one example of a rotating machine is shown in FIG. 1. The gas turbine—short for gas-turbine arrangement 1—comprises an air inlet 10 at one end followed by a compressor stage 11 in which incoming air is compressed for application to one or more combustors 12 as combustion devices, which are distributed circumferentially around the turbine axis 13. Fuel is introduced into the combustors, e.g. via supply 14, and is there mixed with a major part of the compressed air leaving the compressor stage 11. Hot gases created by combustion in the combustors 12 are directed to a set of turbine blades 15 within a turbine section 3, being guided in the process by a set of guide vanes 16, and the turbine blades 15 and the shaft—the turbine blades 15 being fixed to a shaft 2—forming the rotor are turned about an axis 13 as a result. The rotating rotor in turn rotates blades of the compressor stage 11, so that the compressed air is supplied by the gas turbine itself once this is in operation.

Figure 2A:
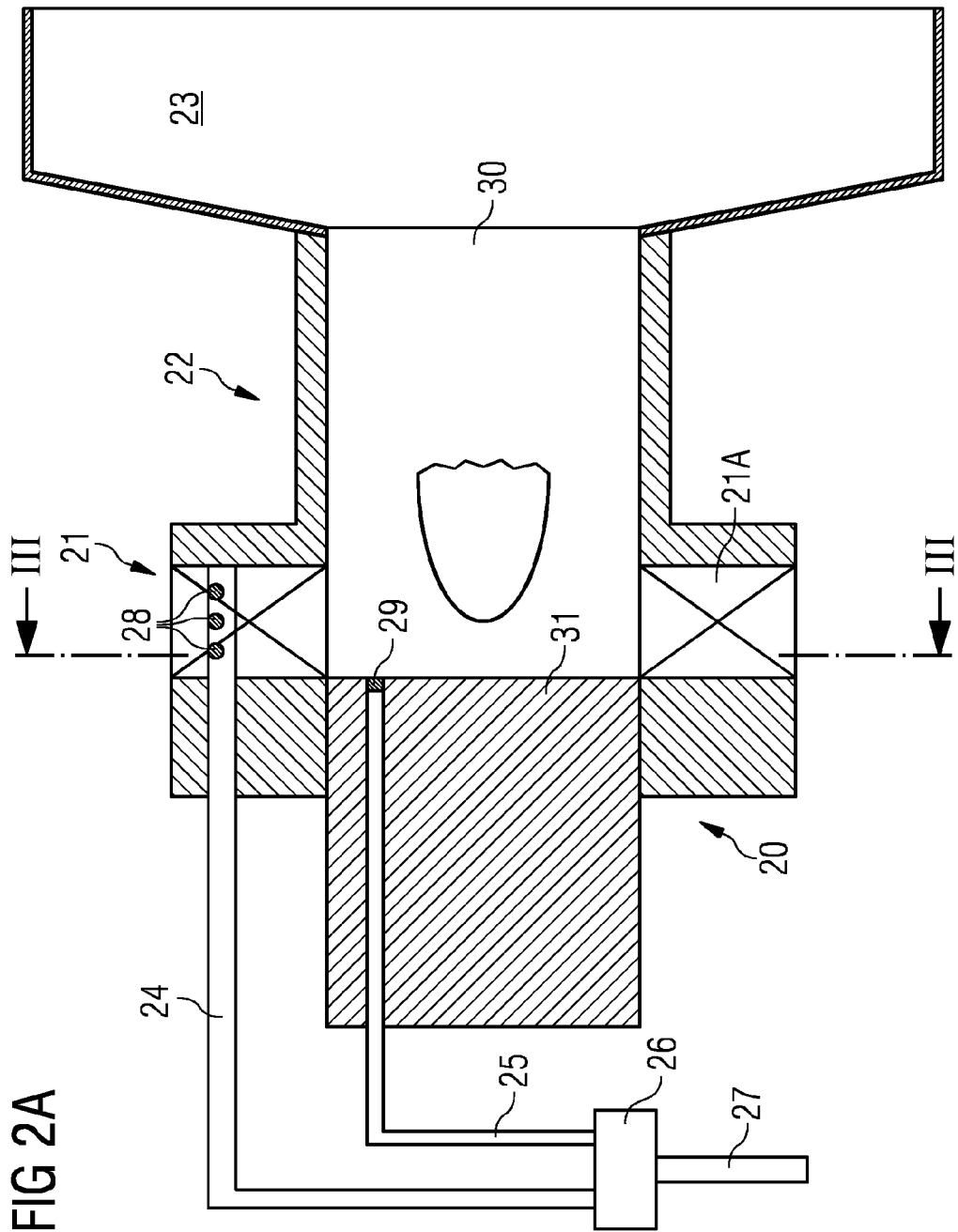
FIG. 2A: shows longitudinal section of a typical combustor.
Figure 2B:
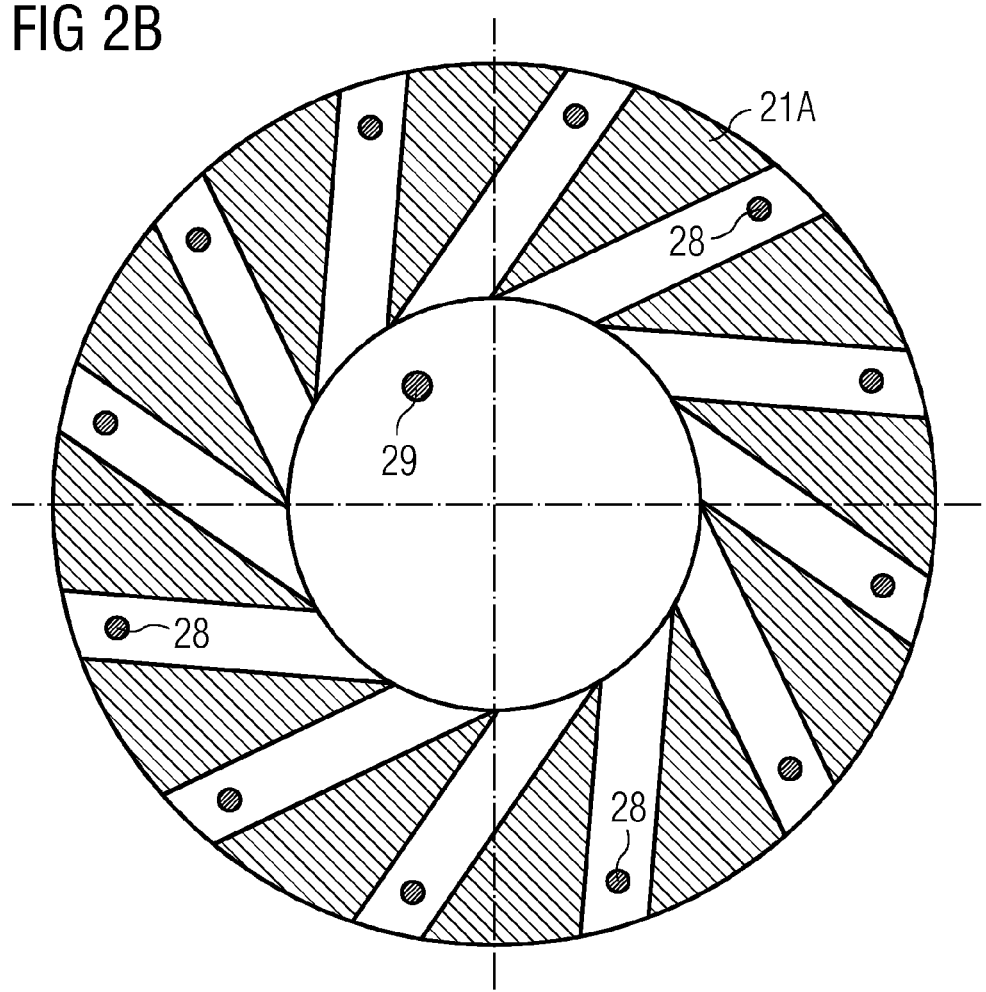
FIG. 2B: shows a section along line III-III in FIG. 2A.

Part of a typical combustor—also called herewith combustion device—is shown in FIG. 2A. (FIG. 2B is a section along a line III-III shown in FIG. 2A.) The combustor comprises at least the following parts: a front-end part 20, a swirler part 21, a burner pre-chamber part 22 and a combustion volume 23. Main fuel—also called primary fuel in this document—is introduced into the swirler 21 by way of the front-end part 20 through a conduit 24, while pilot fuel—also called secondary fuel in this document—enters the burner space through a conduit 25 having at its end a pilot-fuel nozzle 29—i.e. a secondary fuel injection point. The pilot-fuel nozzle may be located at a front face of a central burner 31. The main and pilot fuel flows are derived from a fuel-split valve 26, which is fed with a fuel supply 27 representing the total fuel supply to the combustor. The main fuel flow enters the swirler (21) through a set of main fuel nozzles (or injector) 28 as primary fuel injection points, from where it is guided along swirler vanes 21A, being mixed with incoming compressed air in the process. The resulting air and fuel mixture maintains a burner flame 30. The hot air and fuel mixture from this flame enters the combustion volume 23.

FIG. 2B shows the swirler 21 with a plurality of swirler vanes 21A and a plurality of fuel injection points. The main fuel nozzles 28 are shown in each swirler passage between the swirler vanes 21A. Several other locations are possible. The pilot fuel nozzle 29—here just a single one is shown but more than pilot fuel nozzle could be present—is located in a centre region in which main fuel and air are supposed to be sufficiently mixed. The pilot fuel nozzle 29 can then provide an extra amount of fuel—the pilot fuel—at least in some modes of operation to stabilise the combustion.

Figure 3:
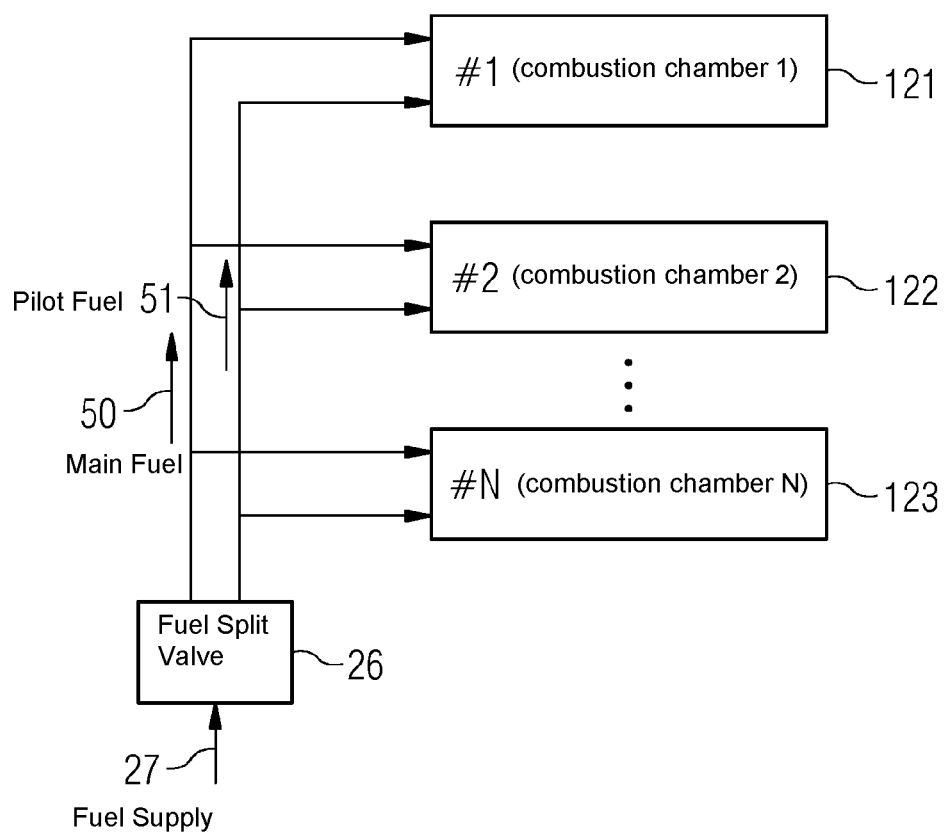
FIG. 3: shows a block diagram illustrating the derivation of main and pilot fuel supplies in a typical gas turbine with multiple combustors.

A gas turbine will often comprise a number of such combustors, in which case the main and pilot fuel-flow distribution will usually be as shown in FIG. 3.

The provided fuel may be gaseous fuel. In another embodiment the fuel may be liquid fuel.

According to FIG. 3 the fuel supply 27—common for all combustion chambers and common for main and pilot fuel—is provided to the fuel split valve 26. The fuel split value 26 is controlled by a control unit and splits the fuel into a line for main fuel 50 and a line for pilot fuel 51. The main fuel is then in particular in even share—provided to the number of combustion chambers present—in the figure as an example to combustion chamber 121 (indicated also as combustion chamber "#1"), combustion chamber 122 (indicated also as combustion chamber "#2"), and combustion chamber 123 (indicated also as combustion chamber "#n", as it should reflect any possible number of n combustion chambers).

The inventive method may also be used in a further embodiment in which the primary fuel may be gaseous fuel of one type and the secondary fuel may be gaseous fuel of a second type. The same is also possible for two different sources of liquid fuel.

Nevertheless, in the following a gaseous fuel supply, provided to both the primary and secondary fuel feed, will be looked at.

It is normally desirable to maintain a constant total fuel supply to a combustor (or set of combustors, where there is more than one) in order to match a constant load imposed on the apparatus, which may be, for example, a gas turbine. Where the load on the gas turbine changes, it will then be necessary to change the total fuel supply to the gas turbine, but not otherwise, normally.

Figure 4:
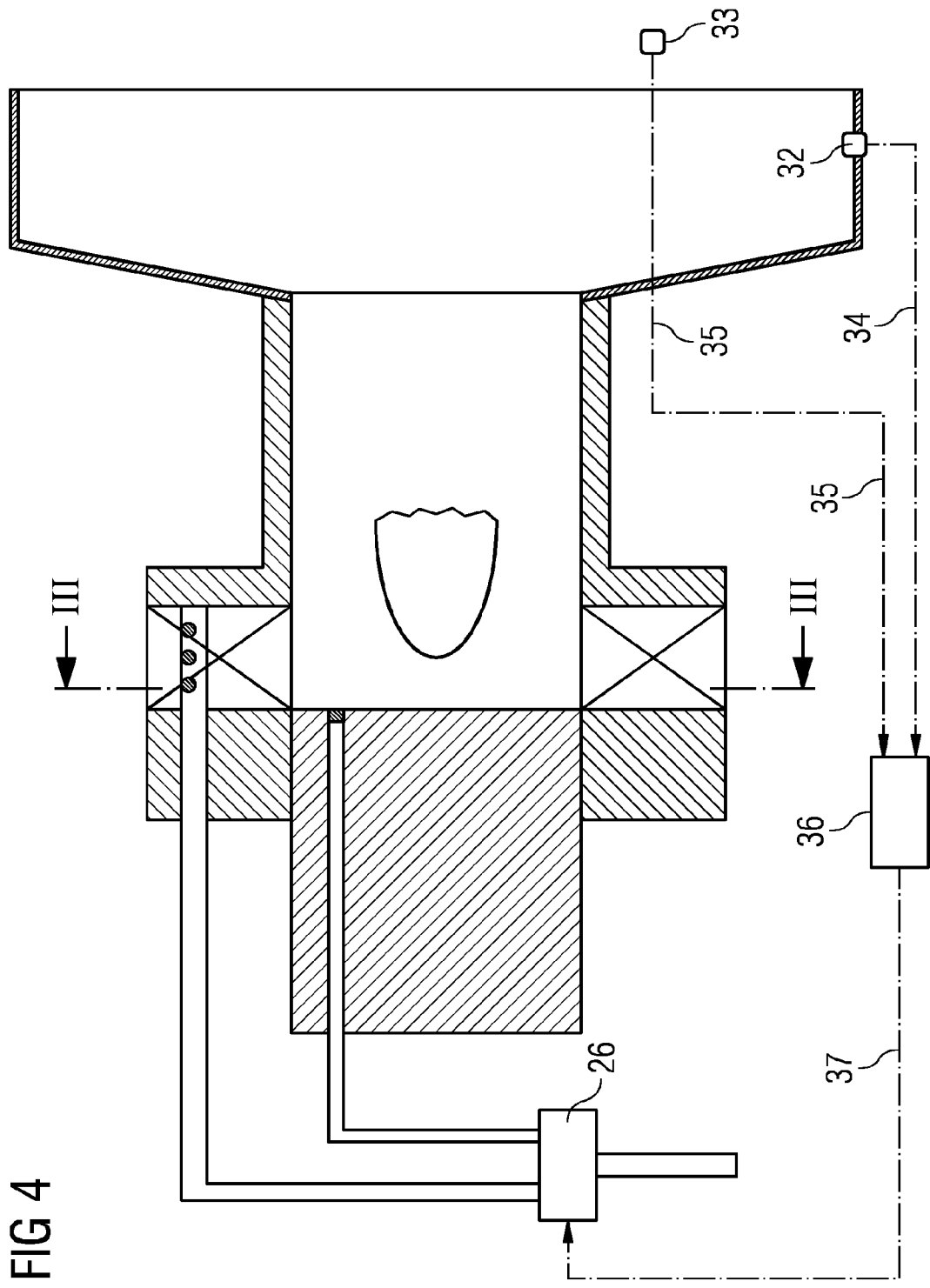
FIG. 4: shows a figure like FIG. 2A, in which a control unit, sensors, and control lines are illustrated.

Referring now briefly to FIG. 4, which corresponds to FIG. 2A, temperature and pressure oscillations in this combustor arrangement are measured as an example by placing, firstly, a temperature sensor 32 and, secondly, a pressure sensor 33 within the combustion volume 23. The outputs 34 and 35 from the two sensors 32, 33 are taken to a control unit 36 and an output 37 of the control unit controls the ratio of main and pilot fuel through the fuel split valve 26.

The control unit 36 contains processing apparatus to carry out an algorithm suitable for keeping the operation of the gas turbine inside a wanted area, which is now explained further by reference to the further figures.

Figure 5:
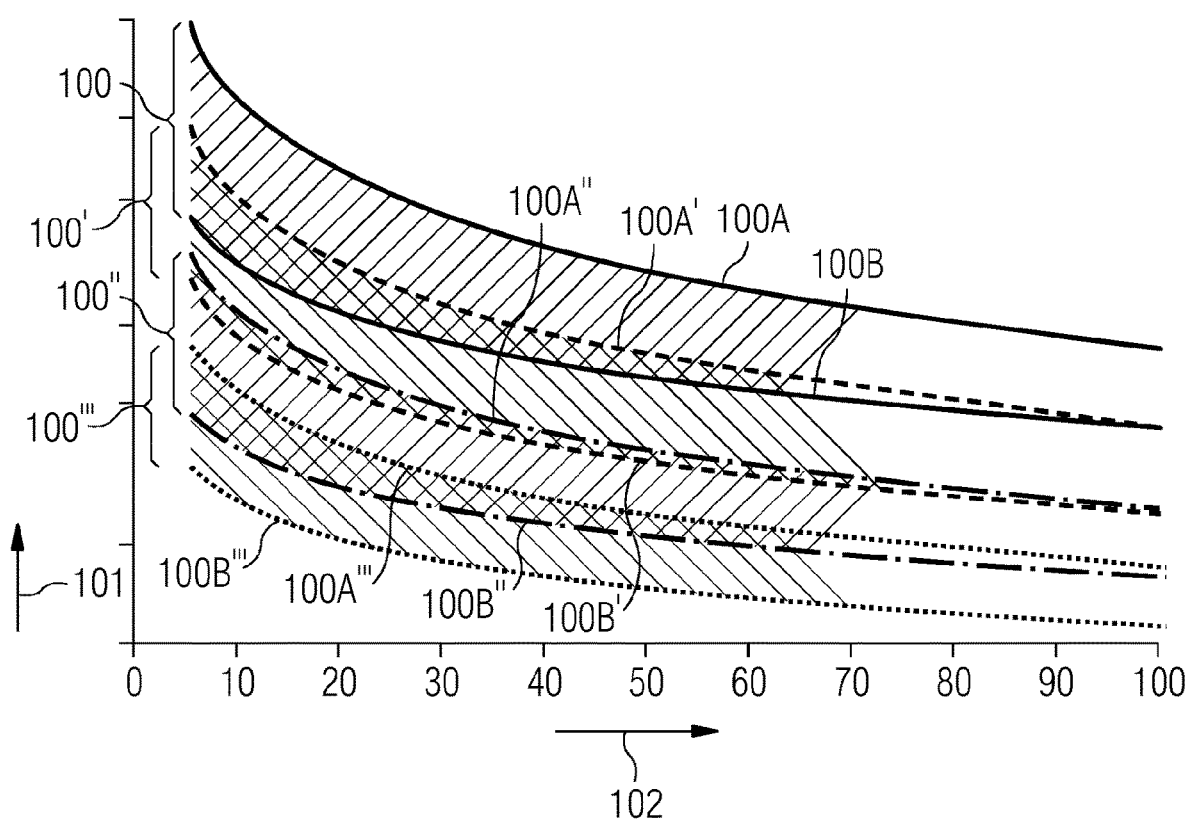
FIG. 5: shows multiple bands of operational ranges for different fuels.

According to FIG. 5, several bands of operation are shown, each band defined for a specific fuel type.

More particularly predefined bands 100, 100', 100", and 100''' of fuel split 101 (i.e. different fuel split setting values) are pre-defined and shown in the figure in relation to an engine load 102. The bands 100, 100', 100", and 100''' each are preset for a given Wobbe Index range of the fuel. The Wobbe Index range defines a range of allowable heating values for the supplied fuel.

The Y-axis of the shown graph in FIG. 5 indicates the fuel split, which can also be defined as the amount of pilot fuel divided by the sum of the amounts of main fuel and pilot fuel. The X-axis may indicate the range of engine loads. The bands shown will generally define a higher supply of pilot fuel for low engine loads and a reduced pilot fuel supply for high engine loads.

It has to be noted that the bands 100, 100', 100", and 100''' overlap in parts so that two neighbouring bands have areas in which for a given load and a given Wobbe Index and a given fuel split the method can select one of the two bands as the band that should be used for control.

Each band is defined allowable values that lie in between a pair of minimum and maximum boundary curves. For the first band 100 a minimum maximum boundary curve 100B is defined and a maximum boundary curve 100A. Similarly, for the second band 100' a minimum maximum boundary curve 100B' is defined and a maximum boundary curve 100A', for the third band 100" a minimum maximum boundary curve 100B" is defined and a maximum boundary curve 100A", and for the fourth band 100''' a minimum maximum boundary curve 100B''' is defined and a maximum boundary curve 100A'''. In between these thresholds, a range of acceptable, tolerable and/or wanted operating points lie. What can be seen in the exemplary FIG. 5, that for lower loads, the bands 100, 100', 100", 100''' have a clear overlap, i.e. the minimum maximum boundary curve 100B is below the maximum boundary curve 100A'. With higher loads, this overlap is reduced such that at high loads the minimum maximum boundary curve 100B may converge the maximum boundary curve 100A'.

The maximum boundary curves 100A, 100A', . . . each define a maximum fuel split level for a specific engine load, and the minimum boundary curves 100B, 100B', . . . each define a predefined minimum fuel split level for each band.

Figure 6:
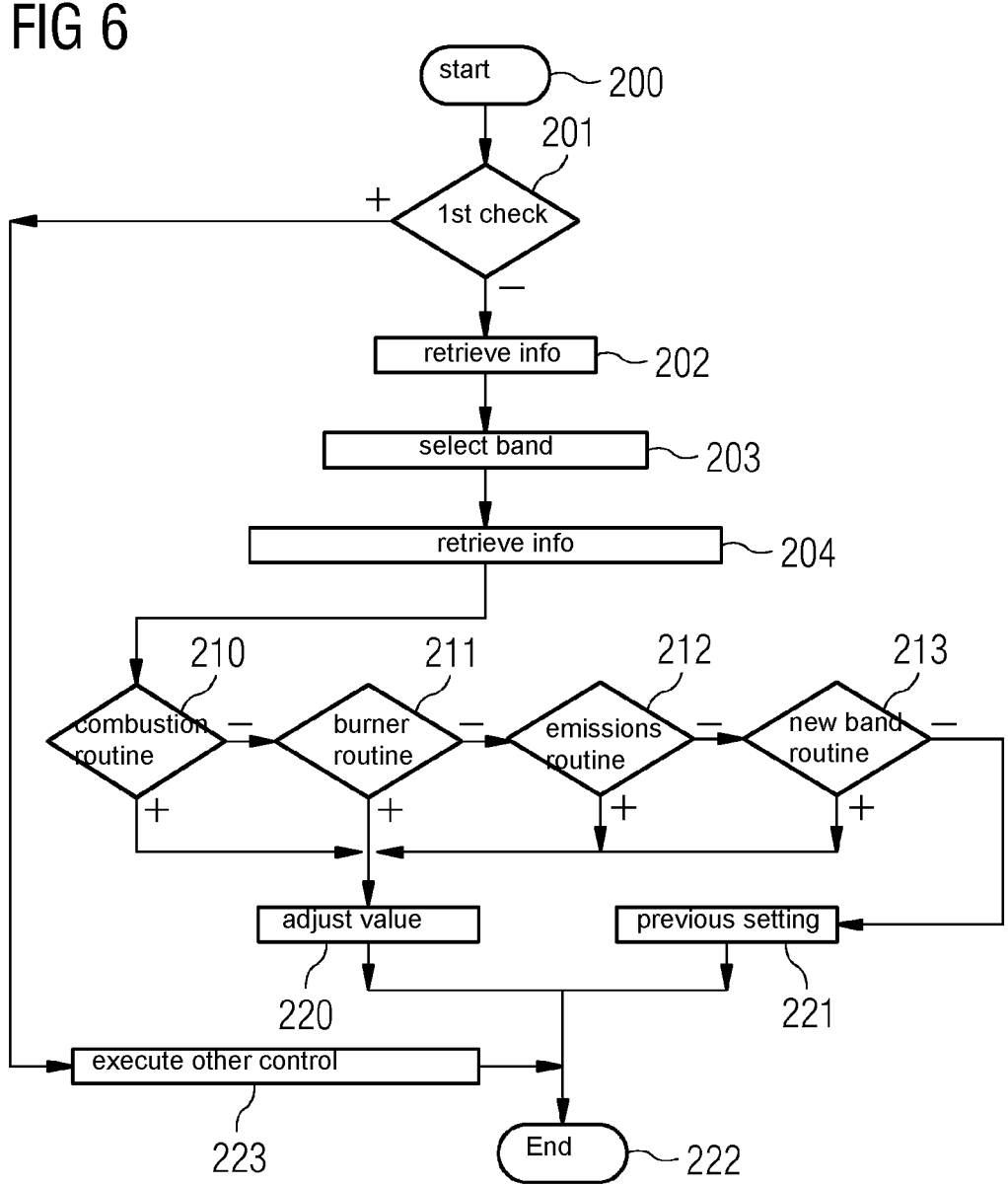
FIG. 6: shows a diagram to illustrate the control loop.

During operation—referencing FIG. 5 and the processing as shown in FIG. 6, the method is started at process step 200. As a first check, it is tested, whether a constant fuel heating input is provided, step 201.

If no constant fuel heating input is present, fuel heating value information is retrieved—step 202. The retrieved information is called first information item according to the patent claims. Any parameter that correlated to the heating value of the provided fuel can be used as the first information item.

Based on the reading of the fuel heating value, and based on the engine load 102—the engine load 102 corresponds to the second information item as defined in the claims—one of the bands 100, 100', 100", 100''' is selected step—203. Thus, a pair of minimum and maximum boundary curves for the fuel split setting is selected and/or set, taken from a plurality of predefined pairs of boundary curves.

If an operating point would fall in an overlapping region in FIG. 5, two bands are candidates to be selected as relevant band according to which the control is performed. To select the more appropriate band of both potential bands, possibly historical data or extrapolated future data can be evaluated.

It may be the goal to select that band that allows the least number of switch overs between bands during future operation of the gas turbine engine.

Thus, it is considered that now, after step 203, the most appropriate or beneficial predefined pair of minimum and maximum boundary curves for the fuel split setting is selected, selected from a plurality of predefined pairs of boundary curves. The selection is performed based on the first information item and the second information item. As it is apparent, the minimum and maximum boundary curves define a band of fuel split settings permitted for a range of second information item values, i.e. in the example for a range of engine load values.

It is important to emphasise, that at this step, only a band is selected, not a single schedule or individual values for the fuel split setting.

The previous analysis does not always require online and continuous monitoring of fuel heating value. The fuel heating value may also be configured or set by an operator. Alternatively the value will be continuously monitored or red.

As of step 204, following step 203, combustion dynamics pressure, emission of NOx, emission of CO, combustion device surface temperature, combustion dynamics noise emission, vibration of the combustion device, and/or flame instability is evaluated. This corresponds to the third information item according to the claims.

For the selected band and for the retrieved third information item a control of the fuel split setting value is performed, wherein the fuel split setting value is used to control a valve—see e.g. fuel split valve 26 in FIG. 3 or 4. The fuel split setting value is adjusted according to process step 220.

To gain an ideal fuel split setting value at least one of several sub routines (or sub model) may be executed. Particularly a sub routine 210 may be initiated to respond properly to combustion dynamics or pressure dynamics. If this does not require an adjustment of the fuel split setting value, a further sub module 211 may be initiated to respond properly to burner temperatures. Again, if this does not require an adjustment of the fuel split setting value, a sub module 212 may be initiated which performs action in response to emissions, such as to minimise emission. As a final step in this example, if again it is not yet required to adjust the fuel split setting value, a further sub module 213 may be initiated to select a new band as shown in FIG. 5, i.e. to select a fuel schedule.

If one of the sub modules results in that an adjustment of the fuel split setting value is wanted, then in step 220 the adjustment will be performed.

If one of the sub modules results in that an adjustment of the fuel split setting value is wanted or needed, then the previous setting remains active—step 221. The stored setup is used.

Finally, the control method can terminate—step 222—or could jump back to the start position 200.

As previously said, as a first check it is tested, whether a constant fuel heating input is provided, see step 201.

If a constant fuel heating input is present, this improved control method can be bypassed and other control methods can be executed, step 223.

The execution as explained according to FIG. 6 is only one example to illustrate the invention. Other embodiments are possible.

Note that in FIG. 6 a "+" means a branch is taken in case that a check is positive, "−" if a check is negative.

The invention claimed is:

1. A method for determining a fuel split setting value utilisable for adjusting a fuel split setting for a combustion device, the fuel split setting defining a relation between main fuel provided at primary fuel injection points and pilot fuel provided at at least one secondary fuel injection point, both being supplied to the combustion device for being combusted to a combusted fluid, the method comprising:

retrieving a first information item correlated to a heating value of the supplied main fuel;

retrieving a second information item correlated to a combustor operating condition when combusting the supplied main fuel and the pilot fuel;

retrieving at least one third information item, the at least one third information item representing stability of combustion in the combustion device;

selecting a predefined pair of minimum and maximum boundary curves for the fuel split setting from a plurality of predefined pairs of boundary curves based on the first information item and the second information item, wherein each predefined pair of minimum and maximum boundary curves of the plurality of predefined pairs of boundary curves defines a respective band of fuel split settings permitted for a range of second information item values, wherein each band is preset for a given Wobbe Index range of the supplied main fuel, wherein the Wobbe Index range defines a range of allowable heating values for the supplied main fuel; and determining the fuel split setting value within the selected predefined pair of minimum and maximum boundary curves based on the at least one third information item, wherein the determined fuel split setting value being utilisable for adjusting the fuel split setting for the combustion device.

2. The method according to claim 1, further comprising: setting a control parameter to control an amount of the main fuel provided to the primary fuel injection points and/or an amount of the pilot fuel provided to the at least one secondary fuel injection point based on the determined fuel split setting value.

3. The method according to claim 1, further comprising: establishing a second interval of time, establishing a first interval of time that is longer than the second interval of time, retrieving the first information item during the first interval of time, retrieving the second information item during the second interval of time, and retrieving the third information item during the second interval of time.

4. The method according to claim 1, wherein the first information item is retrieved in response to at least one of a change in composition for the supplied main fuel, a change in composition for the supplied pilot fuel, a switchover to a different source for the supplied main fuel, and a switchover to a different source for the supplied pilot fuel.

5. The method according to claim 1, wherein the determining the fuel split setting value is executed continuously or in response to a change of the second information item and/or a change of the at least one third information item.

6. The method according to claim 1, wherein, for the retrieving of the first information item, the heating value of the supplied main fuel is determined via a sensor signal.

7. The method according to claim 1, wherein, for the retrieving of the second information item, at least one of a firing temperature, an exit temperature of the combusted fluid exiting the combustion device, a thrust of the combusted fluid, and a turbine entry temperature of a turbine section of a rotating machine is determined or calculated via a sensor signal, or an engine load of the rotating machine is determined via a load indicator by at least one of evaluating torque of a shaft and revolving speed of the shaft of the rotating machine driven in response of the combustion by the combustion device.

8. The method according to claim 1, wherein, for the retrieving the at least one third information item, at least one sensor signal is evaluated, the at least one sensor signal representing at least one of combustion dynamics pressure, emission of NOx, emission of CO, a surface temperature of the combustion device, noise emission, vibration of the combustion device, a combustion gas temperature, and flame failure.

9. The method according to claim 1, wherein said each predefined pair of minimum and maximum boundary curves is defined at least by a respective predefined maximum fuel split level provided over said range of second information item values and a respective predefined minimum fuel split level provided over said range of second information item values, wherein the predefined maximum fuel split level represents a relation between the pilot fuel and the main fuel with a highest tolerable percentage of the pilot fuel in relation to the main fuel, and wherein the predefined minimum fuel split level represents a relation between the pilot fuel and the main fuel with a lowest tolerable percentage of the pilot fuel in relation to the main fuel.

10. The method according to claim 1, further comprising: selecting a predefined control logic method from a plurality of predefined control logic methods based on at least one of the first information item, the second information item, and the at least one third information item, wherein for the determining the fuel split setting value is performed by executing the selected control logic method.

11. The method according to claim 1, wherein the main fuel and the pilot fuel both have the same chemical composition and/or both being a gaseous fuel.

12. The method according to claim 1, wherein the second information item comprises at least one of a firing temperature, an exit temperature of the combusted fluid exiting the combustion device, thrust of the combusted fluid, and an engine load of a rotating machine downstream of the combustor device and driven in response of a flow of the combusted fluid.

13. The method according to claim 1, wherein the at least one third information item comprises at least one of combustion dynamics pressure, emission of NOx, emission of CO, surface temperature of the combustion device, combustion dynamics noise emission, vibration of the combustion device, and flame instability.

14. A control unit for a combustion device, wherein the control unit comprises a processor configured for determining a fuel split setting value utilisable for adjusting a fuel split setting for the combustion device, the fuel split setting defining a split of a main fuel provided at primary fuel injection points and pilot fuel provided at at least one secondary fuel injection point, both supplyable to the combustion device for being combusted to a combusted fluid, wherein the control unit is configured to carry out a method comprising:
retrieving a first information item correlated to a heating value of supplied primary fuel of the main fuel;
retrieving a second information item correlated to a combustor operating condition when combusting the main fuel and the pilot fuel;
retrieving at least one third information item, the at least one third information item representing stability of combustion in the combustion device;
selecting a predefined pair of minimum and maximum boundary curves for the fuel split setting from a plurality of predefined pairs of boundary curves based on the first information item and the second information item, wherein each predefined pair of the minimum and maximum boundary curves of the plurality of predefined pairs of boundary curves defines a respective band of fuel split settings permitted for a range of second information item values, wherein each band is preset for a given Wobbe Index range of the supplied main fuel, wherein the Wobbe Index range defines a range of allowable heating values for the supplied main fuel; and
determining the fuel split setting value within the selected predefined pair of minimum and maximum boundary curves based on the at least one third information item, wherein the determined fuel split setting value being utilisable for adjusting the fuel split setting for the combustion device.

15. The control unit according to claim 14, wherein the control unit is further configured for collecting information from sensors, the sensors providing information related to:
the heating value of the supplied main fuel and/or a heating value of the supplied pilot fuel, and/or
the combustor operating condition, and/or
combustion dynamics pressure, and/or emission of NOx, and/or emission of CO, and/or surface temperature of the combustion device, and/or noise emission, and/or vibration of the combustion device, and/or flame failure.

16. The control unit according to claim 14, wherein the control unit further comprises a control output interface for setting a control parameter to control, by means of one or more valves, an amount of the main fuel and/or an amount of the pilot fuel to be supplied to the combustion device based on the determined fuel split setting value.

17. A rotating machine or a gas turbine engine, comprising:
a combustion device, the control unit according to claim 14 to control the fuel split setting value of the combustion device,
a shaft, and
a turbine section downstream of the combustion device for driving a rotation of the shaft in response to a combusted fluid provided from the combustion device to the turbine section during operation.

18. The control unit according to claim 14, wherein the main fuel and the pilot fuel both have the same chemical composition and/or both being a gaseous fuel.

19. The control unit according to claim 14, wherein the second information item comprises at least one of a firing temperature, an exit temperature of the combusted fluid exiting the combustion device, thrust of the combusted fluid, and an engine load of a rotating machine downstream of the combustor device and driven in response of a flow of the combusted fluid.

20. The control unit according to claim 14, wherein the at least one third information item comprises at least one of combustion dynamics pressure, emission of NOx, emission of CO, surface temperature of the combustion device, combustion dynamics noise emission, vibration of the combustion device, and flame instability.

21. The control unit according to claim 15, wherein the combustor operating condition comprises a firing temperature, an exit temperature of the combusted fluid exiting the combustion device, a thrust of the combusted fluid, or an engine load of a rotating machine that is driven in response of a flow of the combusted fluid.

* * * * *